S. L. WISEMAN.
FRUIT PICKER.
APPLICATION FILED JULY 25, 1910.
992,322.
Patented May 16, 1911.
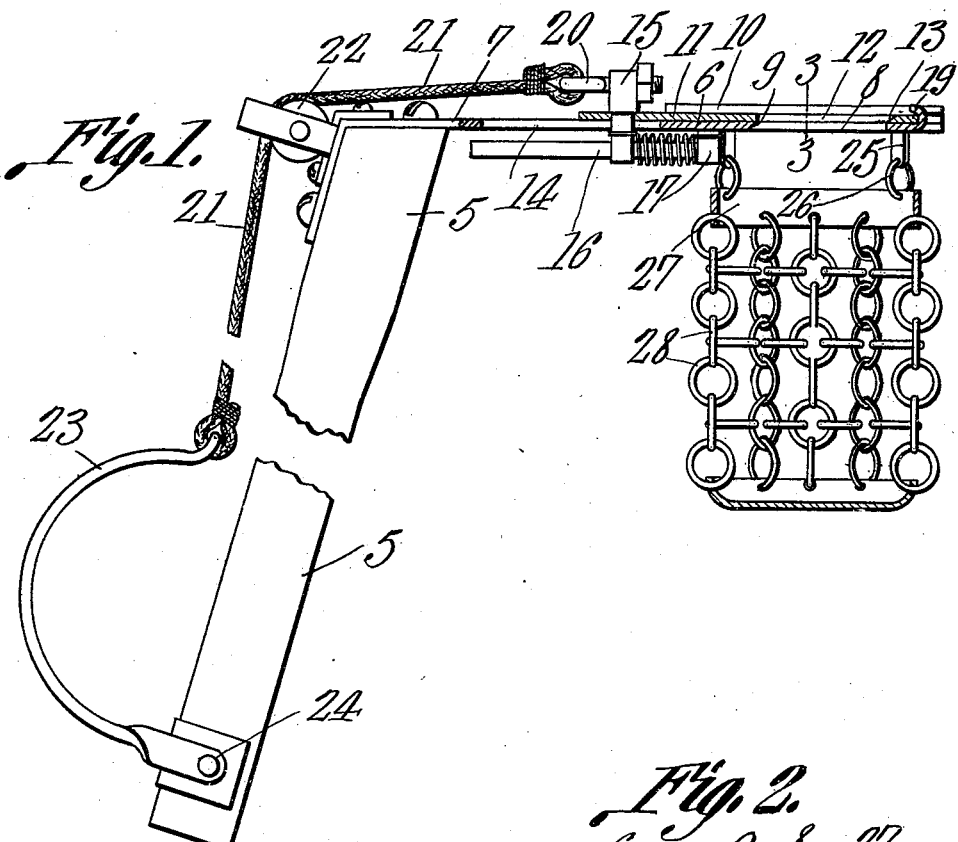
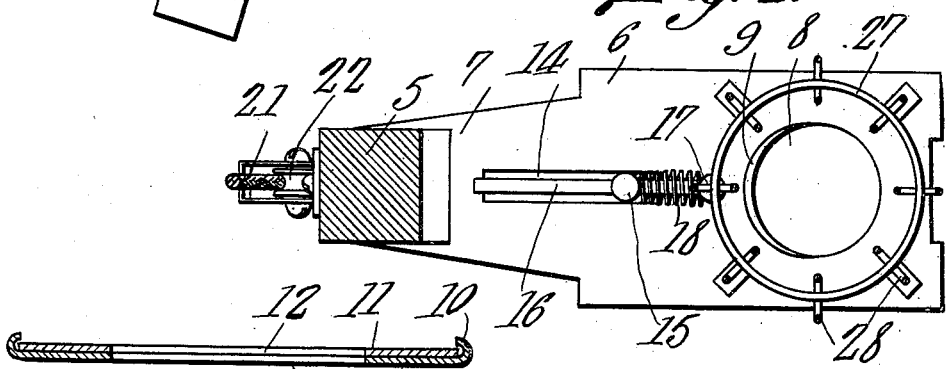
Witnesses
Smith L. Wiseman,
Inventor
by C. A. Snow & Co.
Attorneys

UNITED STATES PATENT OFFICE.

SMITH L. WISEMAN, OF CHICAGO, ILLINOIS.

FRUIT-PICKER.

992,322.  Specification of Letters Patent.  Patented May 16, 1911.

Application filed July 25, 1910. Serial No. 573,803.

*To all whom it may concern:*

Be it known that I, SMITH L. WISEMAN, a citizen of the United States, residing at Chicago, in the county of Cook and State of Illinois, have invented a new and useful Fruit-Picker, of which the following is a specification.

It is the object of the present invention to provide an improved construction of fruit picker and the invention relates more particularly to that class of these devices embodying a receptacle for the fruit and means for severing the stem of the fruit from the limbs of the trees and one of the aims of the present invention is to so construct and arrange the stem severing means and the receptacle for the picked fruit as to insure of dropping of the fruit into the receptacle immediately after the stems are severed.

A further aim of the invention is to provide a fruit stem severing means and a fruit receiving means all supported upon a plate attachable to an ordinary pole of any length, the means being operable through the medium of a cable also of any desired length.

With the above and other objects in view, the invention consists in the general construction and arrangement of parts shown in the accompanying drawings, in which, Figure 1 is a view in side elevation and partly in section of the fruit picker embodying the present invention; Fig. 2 is a bottom plan view thereof, a portion of the receptacle being omitted; and, Fig. 3 is a transverse sectional view on the line 3—3 of Fig. 1, in detail.

In the drawings, the device is illustrated as having its fruit stem severing and its fruit gathering parts mounted at the upper end of a pole and said pole is indicated by the numeral 5 and may be of any desired length. A plate 6 has a narrowed or shank portion 7 which is secured to the upper end of the pole with the plate extending at an obtuse angle to the pole and forwardly in advance thereof as illustrated in Fig. 1 of the drawings. For a purpose to be presently explained the plate 6 is formed with an opening 8 near its forward end and this opening is of sufficient diameter to permit of the ready passage of fruit therethrough. Also, for a purpose to be presently explained, the plate has the rear portion of the edge of its opening 8 sharpened to a cutting edge as at 9.

Each side edge of the plate 6 is struck up as at 10 and overturned so as to afford a guide flange and fitted between these flanges and slidable upon the upper face of the plate is a plate 11 formed with an opening 12 corresponding in diameter to the opening 8 in the plate 6 and having the forward portion of its edge sharpened to a cutting edge as at 13. The plate 6 is formed at its rear and in its shank portion 7 with a slot which is indicated in the drawings by the numeral 14 and there is secured through the plate 11 near the rear end thereof a stud 15 projecting above and below the said plate. The lower portion of the stud projects through the slot 14 as is clearly shown in Fig. 1 of the drawings and is formed with an opening through which slides a stem 16 projecting rearwardly from a stud 17 secured upon the under side of the plate 6. A spring 18 is secured at one end to the stud 17 and at its other end to the downwardly projecting portion of the stud 15 and the tendency of this spring is to draw the stud 15 toward the stud 17 and thereby hold the plate 11 at the forward limit of its movement upon the plate 6, this limit being determined by an upturned flange 19 at the forward end edge of the said plate 6 against which flange the forward end edge of the plate 11 abuts normally.

It will be readily understood that the cutting edges of the plates 6 and 11 are oppositely presented and located so that if the plate 11 should be made to slide rearwardly upon the plate 6, the device having been positioned with the stem of the fruit to be cut projecting through the openings 8 and 12, the said stem would be severed. In order that such movement of the plate 11 may be readily had, the stud 15 has its upper end provided with an eye 20 through which is secured one end of an operating cord or cable 21 trained over a pulley 22 secured upon the shank portion 7 of the plate 6 at its point of connection with the upper end of the pole 5. At its lower end, the cable 21 connects with the upper end of a bowed hand grip 23 pivoted as at 24 at the lower end of the said pole 5. It will be readily understood that movement of the plate 11 rearwardly upon the plate 6 is against the tension of the spring 18 so that when the hand grip 23 has been swung downwardly to so move the plate 11 and is then released the plate will be returned by the force of the spring.

A plurality of ears indicated by the numeral 25 are struck down from the plate 6 surrounding the opening 8 therein and suspended by rings 26 from these ears is a band 27 supporting a chain or other suitable mesh fruit receiving pocket 28.

From the foregoing description of the invention it will now be readily understood that the device is to be positioned with the fruit to be picked disposed beneath the plate 6 with the stem of the fruit projecting through the openings 8 and 12 whereupon the hand grip 23 is swung down so as to exert a pull upon the cable 21 and cause the cutting edges of the plates 6 and 11 to coöperate and sever the said stem of the fruit.

What is claimed is:—

1. In a device of the class described, a hand pole, a plate secured at the upper end of the pole and extending therefrom at an angle approximating a right angle, the said plate being formed with an opening for the passage of fruit, a pocket secured to said plate and positioned beneath the opening, a plate mounted to slide upon the first mentioned plate and formed with an opening, the first mentioned plate being formed with a slot, the last mentioned plate carrying a stud projecting through the slot, a spring connected to the first mentioned plate and to the said stud and holding the plates with their openings in registration, the first mentioned plate at one end being struck up to afford a stop to limit the sliding movement of the second mentioned plate thereon in one direction, the said openings having coöperating cutting edge portions, a stem projecting from the stud upon the first mentioned plate and through the stud upon the second mentioned plate.

2. In a device of the class described, a hand pole, a stationary plate secured to the pole at the upper end thereof and projecting at an angle therefrom, the said plate having its lateral edge portions bent up to afford guides, a plate slidably disposed upon the stationary plate with its lateral edges fitting in the guides, the two plates being formed with registering fruit receiving openings, the openings having coöperating cutting edge portions, the stationary plate at its outer end being bent to afford a stop to limit the sliding movement of the slidable plate thereon in an outward direction, the stationary plate being formed with a slot, a stud carried by the slidable plate and projecting through the slot, a stud upon the under side of the stationary plate, a stem carried by the last mentioned stud and extending loosely through the first mentioned stud, a spring upon the stem secured at its ends to the two studs, a fruit receiving pocket secured to the stationary plate and positioned beneath the opening, and a pull cord connected to the slidable plate.

In testimony that I claim the foregoing as my own, I have hereto affixed my signature in the presence of two witnesses.

SMITH L. WISEMAN.

Witnesses:
W. T. JONES,
W. S. GILMORE.

---

Copies of this patent may be obtained for five cents each, by addressing the "Commissioner of Patents, Washington, D. C."